Patented Aug. 17, 1937

2,090,319

UNITED STATES PATENT OFFICE 2,090,319

CYCLIC UNSATURATED KETONES

Albert Weissenborn, Dessau in Anhalt, Germany, assignor to Winthrop Chemical Company, Inc., New York, N. Y., a corporation of New York No Drawing. Application March 23, 1935, Serial No. 12,727. In Germany March 31, 1934

9 Claims. (Cl. 260—131)

It is known that by treating aliphatic carboxylic acids ketonizing catalysts there can be obtained ketones having fewer carbon atoms owing to the elimination of carbon dioxide and water.

This invention relates to the manufacture of cyclic ketones having the same number of carbon atoms as are present in the parent material, from lactones or the corresponding γ-hydroxy acids or unsaturated acids with elimination of water, the reaction being probably in accordance with the following scheme:

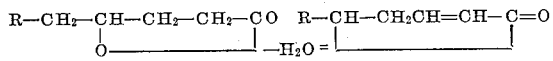

The invention is also applicable when there are present one or more further alkyl groups as substituents attached to one or more carbon atoms in the ring, particularly those adjacent to the keto-group.

Further objects of my invention are the new cyclic ketones obtainable by the said process.

The elimination of water occurs smoothly by heating the material in the presence of a catalyst that eliminates water, particularly an aluminium-magnesium silicate, such silicates being found in commerce for use as activated bleaching earths under the registered trade names Frankonite, Tonsil, Florida fuller's earth, Terrana or green earth. These products are obtainable by treating natural aluminum hydrosilicates with diluted inorganic acids (compare Ullmann, Enzyklopädie der technischen Chemie, II Edition, Vol. 5, page 224).

The following examples illustrate the invention, the parts being by weight: —

*Example 1.*—30 parts of the α-heptyl-γ-methyl-butyrolacetone of the formula

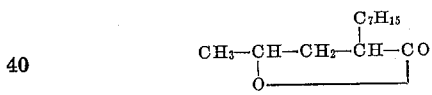

which boils at 150 to 152° C. under 6 mm. pressure, are heated to boiling together with 3 parts of Frankonite in a reflux apparatus. After 2 to 5 hours of this treatment 10 to 15 parts of a ketone boiling at 105 to 110° C. under 4 mm. pressure are obtained, the semi-carbazone of which melts at 196 to 197° C. This ketone has an odor of jasmine reminiscent of iris.

*Example 2.*—If, instead of the α-heptyl-γ-methyl-butyrolactone there is used the corresponding γ-ethyl compound of boiling point 158° C. under 5 mm. pressure, there is formed with elimination of water, a ketone that boils under 5 mm. pressure at 110 to 115° C. and yields a semi-carbazone which melts at 155 to 160° C. A part of the lactone remains and a part is resinified. The ketone smells of jasmine, reminiscent of iris.

*Example 3.*—The γ-n-amylbutyrolactone of boiling point 135 to 140° C. under 5 mm. pressure forms under the given conditions of reaction a ketone boiling at 90 to 95° C. under 3 to 4 mm. pressure, whose semi-carbazone melts at 198 to 199° C. This ketone has a fresh smell of jasmine.

*Example 4.*—300 parts of γ-heptylbutyrolactone which boils at 150 to 153° C. under 5 mm. pressure, are heated to boiling together with 30 parts of Frankonite in a reflux apparatus for 3 hours. By fractional distillation 165 parts of the lactone are recovered which may be used in a new process. Furthermore, 70 parts of hexylpentenone boiling at 100 to 150° C. under 5 mm. pressure are obtained the semi-carbazone of which melts at 193 to 194° C., this ketone has an odor of blooming jasmine.

When carrying out the reaction with 30 parts of the fuller's earth which is traded under the name "Terrana", then 165 parts of the lactone are recovered and 75 parts of the ketone are formed.

In quite analogous manner γ-hexylbutyrolactone, γ-octylbutyrolactone, γ-nonylbutyrolactone, α-butyl-γ-methyl-(or ethyl)-butyrolactone and α-amyl-γ-methyl-(or ethyl)-butyrolactone can be converted into the corresponding ketone.

It is obvious that my invention is not limited to the foregoing examples or to the specific details given therein and, as mentioned above, all the lactones which correspond to the general formula

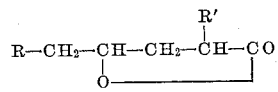

in which R and R' mean hydrogen or an alkyl radicle, may be transformed into cyclic ketones in the manner described in the examples.

Instead of the lactones there may be used such compounds which in the presence of a catalyst that eliminates water, form the lactones. As such compounds I enumerate the corresponding γ-hydroxy acids or unsaturated acids. In the examples following hereafter use is made of such a γ-hydroxy acid and of an unsaturated acid.

*Example 5.*—30 parts of γ-hydroxyundecylic acid are heated to boiling together with 3 parts of Frankonite, Terrana or Tonsil for several hours in a reflux apparatus. In the first stage by elimination of water the corresponding lactone is formed which yields when further heated the ketone the semi-carbazone of which melts at 193 to 194° C.

*Example 6.*—30 parts of butyl-allyl-acetic acid of boiling point 115° C. under 5 mm. pressure are heated to boiling for several hours with 3 parts of Frankonite or another of the activated fuller's earths mentioned above. By elimination of water, apparently after intermediary formation of α-butyl-γ-methylbutyrolactone, the 2-butyl-cyclopentene(4)-on(1) is formed boiling at 90 to 95° C. under 4 mm. pressure, whose semicarbazone melts at 200 to 201° C. The same ketone is obtainable when treating in the manner described α-butyl-γ-methylbutyrolactone boiling at 102 to 104° C. under 5 mm. pressure.

The claims following hereafter are intended to include the procedure disclosed in Examples 5 and 6 according to which the lactone which is to be transformed into the cyclic ketone is formed by elimination of water from a γ-hydroxy acid or an unsaturated acid.

What I claim is:—

1. The process which comprises heating a lactone of the general formula

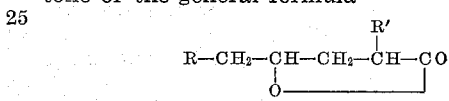

in which R and R' are members of the group consisting of hydrogen and an alkyl radicle, in the presence of an activated bleaching earth as a water eliminating catalyst.

2. The process which comprises heating a lactone of the general formula

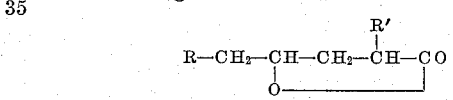

in which R and R' are members of the group consisting of hydrogen and an alkyl radicle, in the presence of a natural aluminum hydrosilicate highly activated by a treatment with hydrochloric acid.

3. The process which comprises heating a lactone of the general formula

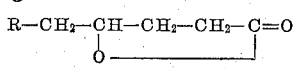

in which R means alkyl, in the presence of an activated bleaching earth as a water eliminating catalyst.

4. The process which comprises heating the lactone of the formula

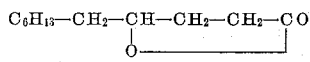

in the presence of an activated bleaching earth as a water eliminating catalyst.

5. The process which comprises heating the lactone of the formula

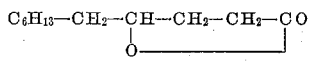

in the presence of a natural aluminum hydrosilicate highly activated by a treatment with hydrochloric acid.

6. The cyclic ketones of the general formula

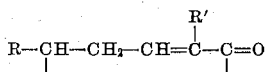

wherein R and R' are members of the group consisting of hydrogen and an alkyl radicle, wherein, however, at most one of these members is hydrogen and at least one alkyl radicle contains more than 3 carbon atoms, said ketones having a smell of jasmine.

7. The cyclic ketones of the general formula

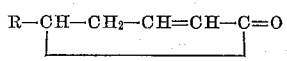

wherein R means an alkyl radicle containing at least 4 carbon atoms, said ketones having a smell of jasmine.

8. The ketone of the formula

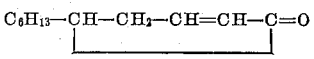

said ketone having an odor of jasmine reminiscent of iris, boiling at 100 to 105° C. under 5 mm. pressure and forming a semi-carbazone which melts at 193 to 194° C.

9. The cyclic ketones of the general formula:

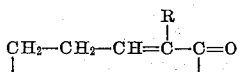

wherein R is an alkyl radical containing more than 3 carbon atoms, said ketones having a smell of jasmine.

ALBERT WEISSENBORN.

CERTIFICATE OF CORRECTION.

Patent No. 2,090,319. August 17, 1937.

ALBERT WEISSENBORN.

It is hereby certified that error appears in the printed specification of the above numbered patent requiring correction as follows: Page 1, first column, line 2, after "acids" insert --with--; line 37, Example 1, for "butyrolacetone" read --butyrolactone--; and second column, line 17, Example 4, for "150° C." read --105° C.--; and that the said Letters Patent should be read with this correction therein that the same may conform to the record of the case in the Patent Office.

Signed and sealed this 26th day of June, A. D. 1945.

Leslie Frazer

Acting Commissioner of Patents.

(Seal)